(12) United States Patent
Englert et al.

(10) Patent No.: US 12,559,351 B2
(45) Date of Patent: Feb. 24, 2026

(54) CONSTRUCTION AND/OR MATERIAL-HANDLING MACHINE

(71) Applicant: Liebherr-Werk Biberach GmbH, Biberach an der Riss (DE)

(72) Inventors: Tobias Englert, Burgrieden (DE); Gerd Booch, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 518 days.

(21) Appl. No.: 17/664,507

(22) Filed: May 23, 2022

(65) Prior Publication Data

US 2022/0297984 A1     Sep. 22, 2022

Related U.S. Application Data

(63) Continuation of application No. PCT/EP2020/082514, filed on Nov. 18, 2020.

(30) Foreign Application Priority Data

Nov. 22, 2019     (DE) ..................... 10 2019 008 130.7
May 6, 2020     (DE) ..................... 10 2020 112 227.6

(51) Int. Cl.
B66C 13/30          (2006.01)
B66C 13/06          (2006.01)
          (Continued)

(52) U.S. Cl.
CPC ............ B66C 13/30 (2013.01); B66C 13/063 (2013.01); B66C 13/085 (2013.01); B66C 13/40 (2013.01);
          (Continued)

(58) Field of Classification Search
None
See application file for complete search history.

(56) References Cited

U.S. PATENT DOCUMENTS

2012/0255188 A1* 10/2012 Tang ..................... B66C 13/46
                                                                            33/365
2015/0353329 A1* 12/2015 Lin ......................... B66C 13/16
                                                                            33/333
          (Continued)

FOREIGN PATENT DOCUMENTS

CN          101657377          2/2010
CN          108883913          11/2018
          (Continued)

OTHER PUBLICATIONS

Mahony, R. et al., "Nonlinear Complementary Filters on the Special Orthogonal Group," in IEEE Transactions on Automatic Control, vol. 53, No. 5, pp. 1203-1218, Jun. 2008, doi: 10.1109/TAC.2008.923738.
          (Continued)

*Primary Examiner* — Jelani A Smith
*Assistant Examiner* — Davin Seol
(74) *Attorney, Agent, or Firm* — Levine Bagade Han LLP

(57)          ABSTRACT

The invention relates to a construction and/or material-handling machine, in particular a crane, comprising a movable functional element, in particular a functional element suspended in an oscillating manner, in particular in the form of a load receiving means, at least one drive device for moving the functional element, a detection device for detecting manual manipulation movements for moving the functional element, and a controller for actuating the drive device on the basis of the detected manipulation movement. The aforementioned detection device has an inertial measuring device, which is attached to the functional element and comprises an acceleration and rotational rate sensor means for providing acceleration and rotational rate signals, and a detection device for detecting the deflection of the functional element from the aforementioned acceleration and rotational rate signals of the inertial measuring device, and the afore-
          (Continued)

mentioned controller is de-signed to actuate the at least one drive device so as to compensate for the detected deflection.

27 Claims, 4 Drawing Sheets

(51) Int. Cl.

| | | |
|---|---|---|
| *B66C 13/08* | (2006.01) | |
| *B66C 13/40* | (2006.01) | |
| *B66C 13/46* | (2006.01) | |
| *G01P 3/44* | (2006.01) | |
| *G01P 15/08* | (2006.01) | |
| *H02K 7/10* | (2006.01) | |

(52) U.S. Cl.

CPC .............. *B66C 13/46* (2013.01); *G01P 3/44* (2013.01); *G01P 15/08* (2013.01); *H02K 7/1004* (2013.01)

(56) References Cited

U.S. PATENT DOCUMENTS

| | | | | |
|---|---|---|---|---|
| 2016/0340861 | A1* | 11/2016 | Takeo | .................... E02F 9/0866 |
| 2018/0079629 | A1 | 3/2018 | Abdallah et al. | |
| 2021/0371250 | A1* | 12/2021 | Bedgood | ................. B66C 13/46 |

FOREIGN PATENT DOCUMENTS

| | | | | | |
|---|---|---|---|---|---|
| CN | 109071186 | | 12/2018 | | |
| DE | 102007012575 | | 9/2008 | | |
| DE | 112009001162 | | 4/2011 | | |
| DE | 202008018260 | | 7/2012 | | |
| DE | 102012220036 | | 5/2013 | | |
| DE | 102014109146 | | 12/2015 | | |
| DE | 102016004266 | | 10/2017 | | |
| DE | 102017103239 | | 8/2018 | | |
| DE | 102017117662 | | 2/2019 | | |
| EP | 2577414 | B1 * | 7/2018 | .............. | B25J 13/02 |
| JP | H05-51196 | | 3/1993 | | |
| JP | 2010-089897 | | 4/2010 | | |
| WO | WO 2017/089236 | | 6/2017 | | |
| WO | WO 2017/174204 | | 10/2017 | | |
| WO | WO-2017174204 | A2 * | 10/2017 | .......... | B66C 13/085 |
| WO | WO 2019/210362 | | 11/2019 | | |
| WO | WO 2021/099374 | | 5/2021 | | |

OTHER PUBLICATIONS

Sabatini, A. M., "Quaternion-based extended Kalman filter for determining orientation by inertial and magnetic sensing," in IEEE Transactions on Biomedical Engineering, vol. 53, No. 7, pp. 1346-1356, Jul. 2006, doi: 10.1109/TBME.2006.875664.

* cited by examiner

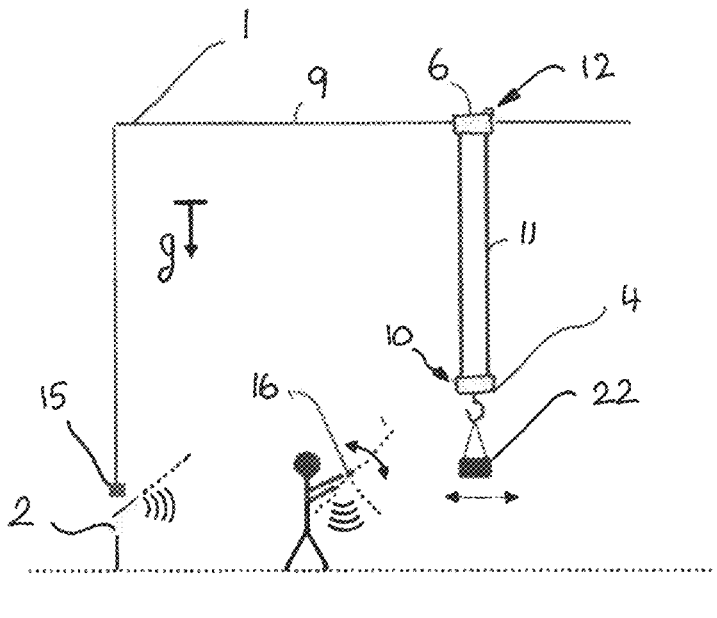
Fig. 3
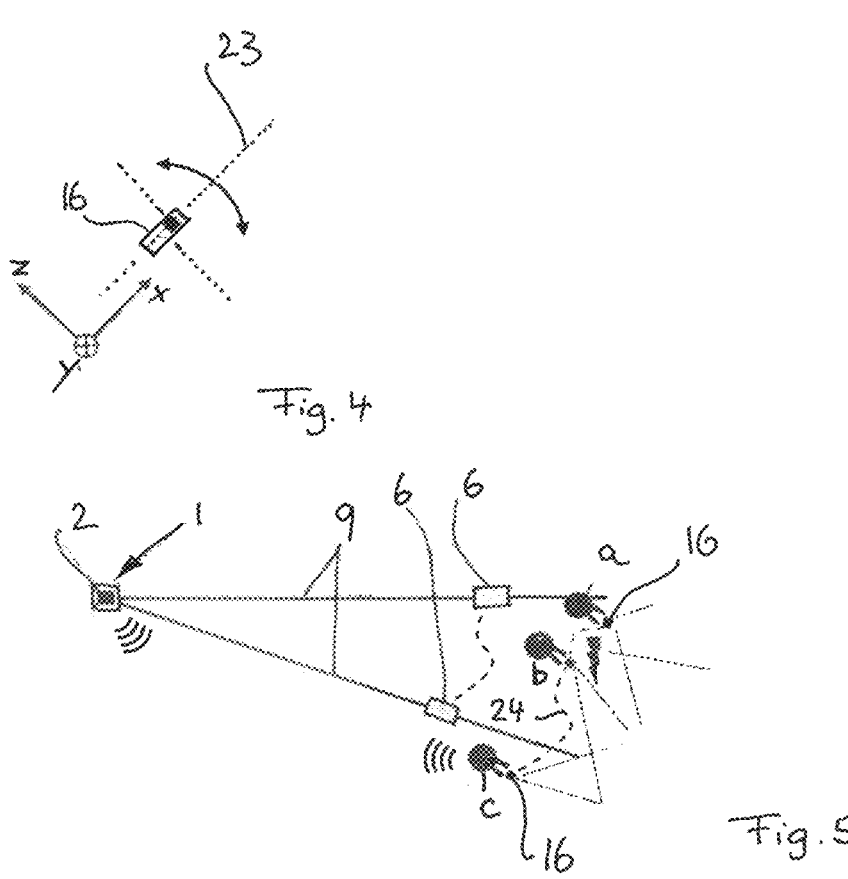
Fig. 4
Fig. 5

CONSTRUCTION AND/OR MATERIAL-HANDLING MACHINE

CROSS-REFERENCE TO RELATED APPLICATIONS

This application is a continuation of International Patent Application Number PCT/EP2020/082514 filed Nov. 18, 2020, which claims priority to German Patent Application Numbers DE 10 2019 008 130.7 filed Nov. 22, 2019 and DE 10 2020 112 227.6 filed May 6, 2020, all of which are incorporated herein by reference in their entireties.

BACKGROUND

The invention relates to a construction and/or material-handling machine, in particular a crane, comprising a movable, functional element suspended in an oscillating manner, in particular in the form of a load hook, at least one drive device for moving the functional element, a detection device for detecting manual manipulation movements for moving the functional element, and a controller for actuating the drive device on the basis of the detected manipulation movement. The invention further relates to a method for controlling a construction and/or material-handling machine, the movable, functional element, in particular suspended in an oscillating manner of said construction and/or material-handling machine, is moved by at least one drive device, wherein the manual manipulation movements for moving the functional element are detected by a detection device and said at least one drive device is controlled by a controller on the basis of the detected manipulation movement.

Cranes such as tower cranes or telescopic boom mobile cranes, or other construction and/or material-handling machines such as cable excavators, usually have a functional element suspended in an oscillating manner, which can be a load receiving means such as a load hook or a magnetic clutch, or also a grappler such as a clamshell, and can be moved by one or more drive devices. In addition to hoisting and lowering movements by retracting or slackening a hoist rope, there can also be performed linear or arcuate traversing movements or mixed forms thereof, for example by moving a trolley, from which the hoist rope extends, along a boom, by rotating a boom, on which the functional element is suspended in an oscillating manner, about an upright axis of rotation, by translatory movement of the boom or the entire machine, for example along a track, by luffing the boom up and down or by telescoping the boom in or out. For said traversing movements, there are regularly provided corresponding drive devices, which can be typically actuated by an electronic controller.

Such electronic controllers, which typically comprise a microprocessor and a program memory, can run predetermined control programs, for example to travel a predetermined or programmable travel path with the functional element, and/or implement manually input control commands. For this purpose, the controllers can include an input device through which there can be input the corresponding control commands, which are then used by the control computer or the controller to actuate the corresponding drive devices or are converted into corresponding data processing.

Said input devices typically comprise operating elements mounted in the machine operator's station, such as control levers, joysticks, slide switches, rotary switches, push buttons or operating keys, although more recently electronic input means, such as a touchscreen, have also been used to enable inputting control commands.

In addition to input devices that are mounted as stationary at the operator's station, and allow an operation at the machine operator's station itself, it has also already been proposed to use a mobile end device configured in the manner of a tablet, a remote control unit or a cell phone, which can communicate wirelessly with the controller of the machine. Such a mobile end device considerably facilitates operation and monitoring of the construction machine, since the machine operator can, for example, monitor the task to be performed very close to the functional element and input the necessary control commands, for example by tapping a touchscreen of a tablet. On the other hand, such mobile devices also have their disadvantages. For example, they may be left at the machine operator's station or the operator may be unintentionally distracted, for example when watching the tablet display. In addition, such mobile end devices are also quite demanding in terms of orientation if, for example, the machine operator does not always assume exactly the same orientation relative to the machine or relative to the functional element, or control commands such as right and left have to be entered in a mirror-inverted manner depending on whether the functional element is moving towards or away from the machine operator.

To further simplify operation, it is also already known to attach control command input means directly to the load hook of a crane. For example, the document DE 10 2016 004 266 A1 proposes to attach a control module to the load receiving means of a crane, which has pushbuttons and grips in order to be able to input certain control commands directly at the load hook by pressing down the pushbuttons or turning the grips, respectively, in order to move the load hook in a desired direction.

WO 2017/174204 A2 describes a similar control module that can be attached to the load hook and has a grab handle to which force and moment sensors are attached to detect manual manipulation forces and torques, which are then converted into corresponding control commands. As an alternative to a control module attached directly to the load hook, there are also proposed gloves which, in the form of wearables, are equipped with sensors that can detect actuation forces when the gloves are pressed against the load hook or a load attached thereto, or can also detect hand movements in order to implement gesture control.

However, if an actually sensitive, precisely reacting control is to be achieved, such a detection of the manipulation forces or torques by force or torque sensors is quite complex. On the one hand, the forces detected do not have to be identical to the forces or torques actually acting on the functional element if, for example, the grab handle attached to the load hook is picked in different ways by different machine operators, or the gloves in the form of wearables are not applied exactly in the predetermined orientation or at the predetermined position, or are pulled with one hand and pressed with another. On the other hand, converting the recorded manipulation forces and accelerations or torques is also not entirely simple, since other influencing variables act on the functional element in addition to the manipulation forces and torques specified. For example, from a load hook there are often suspended loads of different weights or loads with different areas exposed to wind, etc.

SUMMARY

It is the underlying object of the present invention to provide an improved construction and/or material-handling machine of said type and an improved method for controlling such a construction and/or material-handling machine that avoid disadvantages of the prior art and advantageously further develop the latter. In particular, an intuitive operability of the control of the traversing movements without orientation difficulties for the machine operator is to be achieved, which allows a sensitive directing of the functional element even with varying external loads.

Said task is solved, according to the invention, with a construction and/or material-handling machine as claimed in claim 1 and a method as claimed in claim 27. Preferred embodiments of the invention are the subject-matter of the dependent claims.

It is therefore proposed to detect manual manipulation movements of the functional element by means of an inertial detection device mounted functional element suspended in an oscillating manner and providing acceleration and rotational rate signals representing translatory accelerations and rotational rates of the functional element. Such an inertial measurement unit attached to the functional element, that is sometimes also called an IMU, can have acceleration and rotational rate sensor means for providing acceleration signals and rotational rate signals that indicate, on the one hand, translatory accelerations along different spatial axes and, on the other hand, rotational rates or gyroscopic signals with respect to different spatial axes. As rotational rates there can be provided rotational speeds, but in principle also rotational accelerations or also both.

From the acceleration and rotational rate signals specified, a determination device determines the direction of the deflection of the functional element, on the basis of which the controller then actuates the at least one drive device so as to compensate for the deflection.

The controller can convert the deflections determined from the signals of the inertial measuring device fully automatically into corrective movements of the actuating drives, or alternatively or additionally also comprise a semi-automatic operating mode in which the crane operator is shown a proposal for corresponding control commands, for example on a display at the crane operator's station, which can then be implemented or also modified if necessary.

Alternatively or additionally, the functional element may comprise an inclinometer capable of directly detecting the deflection, such as a liquid grading sensor or inclinometer.

In order to move the functional element in a certain direction or to approach a certain point with it, the machine operator only needs to pull or push the functional element in the desired direction or to the desired destination point, whereupon the controller actuates the drive device in such a way that the functional element is moved to where the machine operator wants it to go. In this respect the inertial measuring device does not detect the applied manipulation forces or manually applied torques, but the actual deflection of the functional element caused by the manual manipulation, so that sensitive control of the functional element is possible independently of external influences and the respective necessary manipulation forces. This makes control very intuitive and simple for the user, since the user can adapt the manipulation forces to be applied to the conditions without having to be careful that manipulation forces of different heights or directions are translated into different traversing movements or that the functional element is picked at the wrong place. If, for example, a very heavy load is hanging on the load hook, the machine operator will intuitively pull or push the load hook with greater force in order to direct it in a certain direction, while a load-free load hook will intuitively be pulled or pushed more gently and thus with less force in one direction. Despite such different manipulation forces, the actual deflection of the functional element is detected very precisely by the inertial measuring device, as a result of which the drive device can be actuated appropriately in order to compensate for the deflection.

Alternatively or additionally to an inertial measurement unit on the functional element itself, an inertial measurement unit can also be used on a mobile end device such as a smartphone or a tablet to direct the functional element of the machine. Typically, a smartphone or tablet or other handheld communication devices such as PDAs and the like usually have inertial sensor system built in, so that the device inclination and its orientation in space can be detected. A function of smartphones and tablets usually controlled by this is the well-known turning the screen content when the device is rotated from an upright position to a lying position or vice versa.

By means of the inertial measurement unit or IMU, which can have acceleration and rotational rate sensor means, there can be provided, on the one hand, translatory accelerations of the mobile end device along various spatial axes and, on the other hand, rotational rates or gyroscopic signals with respect to various spatial axes, wherein, for example, rotational speeds, but also rotational accelerations or also both can be provided as rotational rates. Based on the signals from the inertial sensor system, a determination device can determine the deflection and/or inclination and/or a movement of the mobile end device, which can then be communicated to the controller of the construction and/or material-handling machine to actuate the drive devices in dependence of the deflection and/or inclination and/or movement of the mobile end device.

In this context, different drive devices and/or different directions of movement of the machine can be assigned to certain tilting and/or inclining movements of the mobile end device. For example, tilting the mobile end device about an axis parallel to the line direction of a text shown on a display of the device can be converted into upward and downward movement of the functional element. Alternatively or additionally, rotating the mobile end device about an axis perpendicular to the display and/or keyboard of the device may be converted into rotating the functional element and/or a boom suspending the functional element about an upright axis of rotation. Alternatively or additionally, a tilting up of the mobile end device about a longitudinal axis of the mobile end device can be converted into a traversing movement of a trolley on the crane or into a luffing movement of the boom of a crane. In principle, however, other axis arrangements can also be provided.

Advantageously, the mobile end device can thereby be provided with reset and/or activation input means to predefine and/or reset a rest position of the device, so that no absolute position of the device in space has to be maintained in order to generate desired corrective movements of the machine. If the state of rest is determined, for example, by actuating a state of rest—source key, which can also be configured in the form of a soft key on a touchscreen surface, the deflection or movement of the end device from this state of rest determined on the basis of the signals from the inertial measurement unit can be used as a control signal or converted into a control signal in order to generate the desired actuating movements of the drive devices of the machine.

Advantageously, the controller can be configured to set the speed and/or acceleration of a respective drive device on the basis of the amount of deflection and/or tilting of the mobile end device, wherein, for example, the drive speed and/or acceleration can be set higher the more the mobile end device is deflected and/or tilted. Range limits can be taken into account, for example in such a way that a drive speed is not increased further when a desired or set maximum speed is reached, regardless of the fact that the mobile end device may be tilted even more.

Advantageously, the controller and/or the mobile end device may comprise setting means for setting the sensitivity, by means of which it can be set how quickly and how strongly a drive device is to react to the tilting or movement of the mobile end device.

Such setting means can, for example, variably preset an adjustable response level in order, for example, not to start the drive device at all in the case of very small tilts and/or not to actuate the drive device until the tilt from the state of rest has exceeded a certain level.

Alternatively or additionally, however, the allocation ratio between the degree of tilt and/or movement of the mobile end device and the speed and/or acceleration of the drive device can be set variably, for example in such a way that tilting from the state of rest by—for example—45° or 90° or 135° is optionally required to command the maximum speed of the drive device.

By means of said sensitivity setting means, there can be in particular influenced the relationship between the inclination of the smartphone or tablet or the speed of the functional element.

Alternatively or additionally, the controller and/or the mobile end device may also have an operating mode in which tilting or moving the mobile end device in a certain direction triggers and also terminates a predetermined drive movement with a predetermined positioning path and/or rotation path distance, regardless of any further tilting of the end device. For example, tilting about the associated axis of the end device can initiate lifting of the load hook by, for example, 50 cm, with the drive device automatically terminating the corrective movement when the load hook has performed the 50 cm hoisting movement, irrespective of the continued tilted position of the end device, if any.

Advantageously, a setting means can also be assigned to this operating mode in order to adjust the movement and/or rotary movement distance triggered by a single tilt or a corresponding movement.

In order to continue the movement, the mobile end device can be moved back to the state of rest and tilted again in the corresponding direction. If necessary, the state of rest can also be reset or readjusted to zero by pressing the corresponding reset key, in order to then direct a next corrective movement by tilting again at intervals.

The inertial measurement unit can advantageously detect accelerations in three spatial axes and rotational rates about at least two spatial axes. The accelerometer means can be configured as working in three axes and the gyroscope sensor means can be configured as working in two axes. However, it is also possible for this purpose to detect the rotational rates about three spatial axes and to configure the gyroscope sensor means to operate in three axes.

In an advantageous further embodiment of the invention, the determination device for determining the deflection of the functional element from the acceleration and rotational rate signals of the inertial measurement unit may comprise one or more orientation filters for determining the direction of the deflection of the functional element. Such orientation filters can be configured to evaluate or filter said acceleration and rotational rate signals with respect to said spatial axes of the inertial measurement unit in order to determine the deflection components with respect to the spatial axes therefrom.

In a further embodiment of the invention, said determination device may also be configured to determine the amount or measure of deflection of the functional element in order to control the speed and/or acceleration of the drive device in dependence on the measure of deflection. For example, at greater deflections, the drive devices can be actuated more quickly than at smaller deflections to give the machine operator the feeling that the strength of the manipulation of the functional element can control the travel speed.

Alternatively or additionally, the dependence between the measure of the deflection and the speed and/or acceleration of the drive device can also be scaled and/or variably adjusted in dependence on the load mass taken up. For example, with larger loads picked up, a higher control speed and/or acceleration of the drive device can be provided for a smaller deflection, while with comparatively small loads, a smaller speed and/or smaller acceleration can be provided for the same deflection. Such an approach is based on the consideration that heavy loads are more difficult to deflect manually than small loads, so that the ease of operation is advantageous for both small and large loads if the dependence between the amount of deflection and the speed and/or acceleration can be varied in dependence on the load mass.

In particular, there can be provided an automatic adjustment device which scales the controller in dependence on a load signal of a detection device for detecting the suspended load in such a way that the dependence between deflection and speed or acceleration of the drive device is variably adjusted in dependence on the suspended load.

The inertial measurement unit attached to the functional element can advantageously transmit its acceleration signals and rotational rate signals and/or signals derived therefrom wirelessly to a control and/or evaluation device that can be attached to a structural part of the crane or that can also be arranged separately close to the crane. The transmission can in particular take place to a receiver that can be attached to the trolley and/or to the suspension from which the hoist rope extends. The transmission can, for example, advantageously take place via a wireless LAN connection.

Such a wireless connection of an inertial measuring device allows it to be retrofitted very easily even on existing cranes without requiring complex retrofitting measures. Substantially only the inertial measurement unit has to be attached to the functional element and the receiver that communicates with it and that transmits the signals to the control device or regulation device.

In order to supply the inertial measurement unit on the functional element with current or energy, the inertial measurement unit can be provided with an energy accumulator, for example in the form of a rechargeable battery. Alternatively or additionally, there can be provided a generator, which can be provided locally in the vicinity of the inertial measuring unit and/or on the functional element and can be advantageously configured to convert movements occurring on the functional element or their kinetic energy into electrical energy. If the functional element is hinged to a hoist rope that is guided around a deflection pulley, the generator can be connected to the deflection pulley by gears in order to convert rotational movements of the deflection pulley into the generation of electrical energy. Alternatively or additionally, the generator can have piezo elements, for example, or to convert alternating loads and/or voltages occurring at the functional element into energy. Alternatively or additionally, inertial generators that convert pendulum movements into electrical energy can also be considered. Alternatively or additionally, the generator may include a photovoltaic element to convert daylight into electricity.

The current provided by the generator can be used directly to supply the inertial sensor system and/or can be temporarily stored in an energy accumulator, from which the inertial measuring unit is then supplied with energy.

So as to be able to control not only the traversing movements in the horizontal, for which the manual manipulation movements benefit from the degree of freedom of the suspension of the functional element in an oscillating manner, but also vertical traversing movements or mixed forms of horizontal and vertical movements, in an advantageous further development of the invention, it can be provided that predetermined movements of the functional element which can be carried out by manual manipulation are converted into a control command which means a lowering or raising of the functional element and causes the at least one drive device to perform a corresponding hoisting or lowering movement. Such a predetermined maneuver or movement of the functional element can be, for example, rotating the functional element about an upright or, if applicable, also a lying axis of rotation, which can advantageously be detected by said inertial measuring unit.

Whilst the machine operator directs horizontal traversing movements or traversing movements with a horizontal component by displacing or retracting the functional element at least approximately horizontally while benefiting from the degree of freedom of the suspension in an oscillating manner, a rotation of the functional element about a preferably upright axis can be interpreted as a control command request to raise or lower the functional element.

The determination device can be configured to determine the direction of said tilting or rotating movement about a horizontal axis and/or to determine the orientation of the horizontal axis about which the rotation takes place, in order to then optionally initiate a hoisting movement or a lowering movement depending on the direction of the rotation or tilting. For example, a preferably short clockwise rotation of the load hook about the vertical axis can be interpreted as a control command for lifting and a counterclockwise rotation of the load hook about said vertical axis as a control command for lowering. Alternatively or additionally, it is also possible to interpret opposite tilting movements about the same axis as a lift and lower command. For example, if the load hook of a crane is tilted to the right about a horizontal tilt axis parallel to the vertical plane by the crane boom, this can be interpreted as a lift command, while tilting to the left about said axis can be interpreted as a lowering command.

In further development of the invention, a detected tilting movement of the functional element about a horizontal axis can be converted into a lifting or lowering movement as long as the functional element is tilted accordingly. Alternatively, however, the controller can also be configured to convert a tilting of the functional element about said lying axis into a lifting or lowering movement by a predetermined lifting or lowering amount, for example in such a way that a slight tilting when lowering by 10 cm and a stronger tilting when lowering by 50 cm or vice versa means a lifting by corresponding amounts.

Alternatively or in addition to a detection of such tilting movements by the inertial measuring unit, in further development of the invention lifting and lowering commands can also be input or coded in another way. For example, tensile force or weight force sensor may be provided, which may include pulling the functional element downward and/or lifting the functional element by manual manipulation. If, for example, the machine operator pulls the functional element down, this is registered by the tensile force and/or weight force sensor specified above. Depending on the corresponding sensor signal, the controller can then initiate a corresponding lowering movement by the drive device. Conversely, if the machine operator attempts to lift the functional element manually, this can also be detected by said sensor system, so that the controller can initiate a hoisting movement depending on a corresponding sensor signal or its change.

If the functional element is a load hook or a load receiving means of a crane, for example, such a tensile force and/or weight force sensor can be provided between the load hook and the deflection pulley, for example in the form of a measuring axle which can be integrated into the deflection pulley in order to be able to detect said pulling or lifting on the load hook.

Since such manual manipulation movements, in particular said lifting, but also said tilting about a horizontal axis, are difficult to perform with large or very heavy functional elements, or only very small positional changes are effected on the functional element and can be detected with corresponding difficulty, in further development of the invention the detection device for detecting manual manipulation movements can also comprise an input device which can be attached to the functional element in order to be able to input manual control commands. Such an input device can comprise, for example, a slide switch that can be moved up and down, or a rocking lever that can preferably be tilted up or down, or operating keys that can be marked with an up or down arrow, for example, or also other operating elements in order to be able to input control commands, in particular control commands for lifting and lowering the functional element.

Such an input device can advantageously comprise input means for directing lifting and lowering movements. Alternatively or additionally, however, said input device may also have input means for causing predetermined traversing movements. For example, input means for performing a predetermined maneuver such as moving around a fixed distance in a predetermined direction. For example, there may be provided an input means for moving the trolley of a tower crane by a fixed distance and/or an input means for lowering by a fixed distance and/or an input means for lifting by a fixed distance. Alternatively or additionally, an operating element can also be provided for changing the travel speed, for example in order to convert a specific deflection of the functional element, which is detected by said inertial measuring unit, into traversing movements of different speeds. For example, there may be provided an input means for selecting a quick or fine adjustment travel. Depending on which travel speed has been selected, pushing or pulling the functional element in a certain direction and the associated deflection, which is detected by the inertial measuring unit, is converted into travel movements of the at least one drive device at different speeds.

In a further advantageous further development of the invention, a horizontal load path can be implemented via a software module. This means that, for example, the height of the load does not change for the operator during horizontal movement, even if the boom is tilted.

In an advantageous further embodiment of the invention, said input device may also comprise an activation input means, for example an arming button, to cause the at least one drive device to move by deflecting the functional element as described and/or applying manipulation forces as described only when the control mode for controlling by deflecting the functional element and/or applying manipulation forces is activated. For example, the operating element can be configured in the manner of a fuse switch or fuse button, which must be touched or depressed or otherwise actuated in order to activate said control mode of the controller by converting a manually manipulated deflection of the functional element and/or a manually manipulated application of forces into corresponding corrective movements.

Such a safety control element can be, for example, a pushbutton on the functional element, a switch, or even a capacitive contact surface that enables said control mode.

In a further development of the invention, the controller may also have a diagonal pull compensation mode of operation in that a hoisting movement is only permitted or enabled when the deflection of the functional element suspended in an oscillating manner falls towards zero or below a predetermined limit value. Alternatively or additionally, said oblique pull compensation operation mode can also be configured to first determine the deflection of the functional element suspended in an oscillating manner relative to the vertical when a hoist request is input—possibly by tilting the functional element about a horizontal axis as explained above—and, if necessary, to compensate for this deflection by actuating the at least one drive device to such an extent that said deflection approaches zero or falls below said threshold value. If the detected deflection determined by the inertial measuring unit is compensated to a sufficient degree, the hoist control command can be implemented.

Said oblique pull compensation operation mode may in this respect include a delay function for delaying execution of a hoist request to delay the hoisting movement until the detected deflection of the function element with respect to the vertical falls below said threshold.

In particular, several calculation steps can provide an accurate estimate of the deflection angle, which can then be used by the controller to actuate the drives. The three calculation steps can in particular comprise the following steps:

i. A determination of the orientation of the IMU, e.g. by a complementary filter, which can determine high-frequency components from the gyroscope signals and low-frequency components from the direction of the gravity vector and combine them complementarily to determine the hook tilt;

ii. Detection of the oblique pull angle by considering the mounting position of the IMU. This can be determined, for example, on the basis of measurement data over a longer period of time.

The highly accurate oblique angle estimation that can be achieved in this way can basically be used for universal functional elements suspended in an oscillating manner and requires a sensor system that can be retrofitted at very low cost. At the same time, there are considerable advantages such as increased safety, improved operability, increased handling performance and automatability.

In this respect, first the tilt of the load hook is advantageously determined from the signals of the inertial measurement unit with the aid of a complementary filter and/or with the aid of a Kalman filter that makes use of the different special features of the translatory acceleration signals and of the gyroscopic signals of the inertial measurement unit, with alternatively or additionally, however, a Kalman filter also being able to be used to determine the tilt of the load hook from the acceleration signals and rotational rate signals. For example, such an orientation filter is described in Mahony, R.; Hamel, T. & Pflimlin, J., Nonlinear Complementary Filters on the Special Othogonal Group, IEEE Transactions on Automatic Control, 2008, 53, 1203-1218 or also Madgwick, S. O. H.; Harrison, A. J. L. & Vaidyanathan, R. Furthermore, a Kalman filter of the above type is described in A. M. Sabatini, "Quaternion-based extended Kalman filter for determining orientation by inertial and magnetic sensing," in IEEE Transactions on Biomedical Engineering, vol. 53, No. 7, pp. 1346-1356, July 2006.

The pendulum sensor system can in particular have first determination means for determining and/or estimating a tilt of the load suspension means from the acceleration signals and rotational rate signals of the inertial measurement unit and second determination means for determining the deflection of the hoist rope and/or of the load-receiving means with respect to the vertical from the determined tilt of the load-receiving means and an inertial acceleration of the load-receiving means.

Said determination means may in particular comprise a complementary filter comprising a high-pass filter for the rotational rate signal of the inertial measurement unit and a low-pass filter for the acceleration signal of the inertial measurement unit or a signal derived therefrom, wherein said complementary filter may be adapted to combine a rotational rate based estimate of the tilt of the load receiving means, based on the high-pass filtered rotational rate signal, and an acceleration-based estimate of the tilt of the load receiving means based on the low-pass filtered acceleration signal, and to determine the sought tilt of the load receiving means from the combined rotational rate and acceleration-based estimates of the tilt of the load receiving means.

The estimate of the tilt of the load receiving means supported by the rotational rate can here comprise an integration of the highpass filtered rotational rate signal.

The estimate of the tilt of the load receiving means supported by acceleration can be based on the quotient of a measured horizontal acceleration component and a measured vertical acceleration component.

According to another aspect of the present invention, said mobile end device, such as a smartphone or tablet, can also be used in other ways to direct the functional element of the machine. In particular, for this purpose there can be used position determining device for determining the position of the mobile end device. Said position determining device can determine a change in the position of the mobile end device, wherein corresponding position data reflecting the change in the position of the end device can be transmitted to the controller of the machine, which then actuates the at least one drive device in dependence on the change in position such that the functional element follows the changing position of the mobile end device. In this tracking of the functional element of the machine, only the mobile end device needs to be moved in the desired direction, which is detected with the help of the position determination means and transmitted to the controller, whereupon the controller actuates the drive devices in such a way that the functional element follows the movement of the mobile end device.

In this regard, the position determining device can operate in various ways, such as having a satellite navigation module to determine the position of the end device and its change by satellite navigation. Alternatively or additionally, however, the position determination means can also evaluate mobile radio data and/or data from the inertial measurement unit IMU in order to determine a change in position and/or the path of the mobile end device.

Advantageously, the mobile end device may comprise activation input means to activate a sequence control mode and/or to trigger or execute said sequence control of the functional element only when said activation input means is actuated. This can be, for example, a button on the mobile end device, the pressing of which transmits the position data to the controller and/or is evaluated by the controller in order to track the functional element of the movement of the end device.

Said activation input means can advantageously be configured in such a way that said tracking function is executed only as long as the activation input means are or remain actuated. For example, if the activation button on the smartphone or tablet stopped to be pressed, the controller can stop the drive device or no longer execute the subsequent movement.

BRIEF DESCRIPTION OF THE DRAWINGS

The present invention is explained in more detail below on the basis of a preferred exemplary embodiment and the corresponding drawings. The drawings show:

FIG. 3 shows a side view of the tower crane similar to FIGS. 1 and 2, wherein the load hook of the tower crane can be directed by means of a mobile end device in the form of, for example, a smartphone or a tablet, wherein tilting movements of the end device are detected by an inertial measuring unit on the mobile end device and transmitted to the controller of the crane in order to direct the drive devices for moving the load hook by tilting the smartphone or end device;

FIG. 4 shows an illustration of various tilt axes with respect to which the mobile end device can be tilted to control various drive movements of the tower crane shown in the foregoing figures;

FIG. 5 shows a top view of the tower crane of the foregoing figures, wherein the load hook of the crane follows the changing position of the mobile end device, for example in the form of the smartphone or tablet, wherein position determining means determine and transmit changes in the position of the end device to the controller of the crane, which then actuates the drive devices to cause the load hook to follow the changing position of the end device.

DETAILED DESCRIPTION

Figure 1:
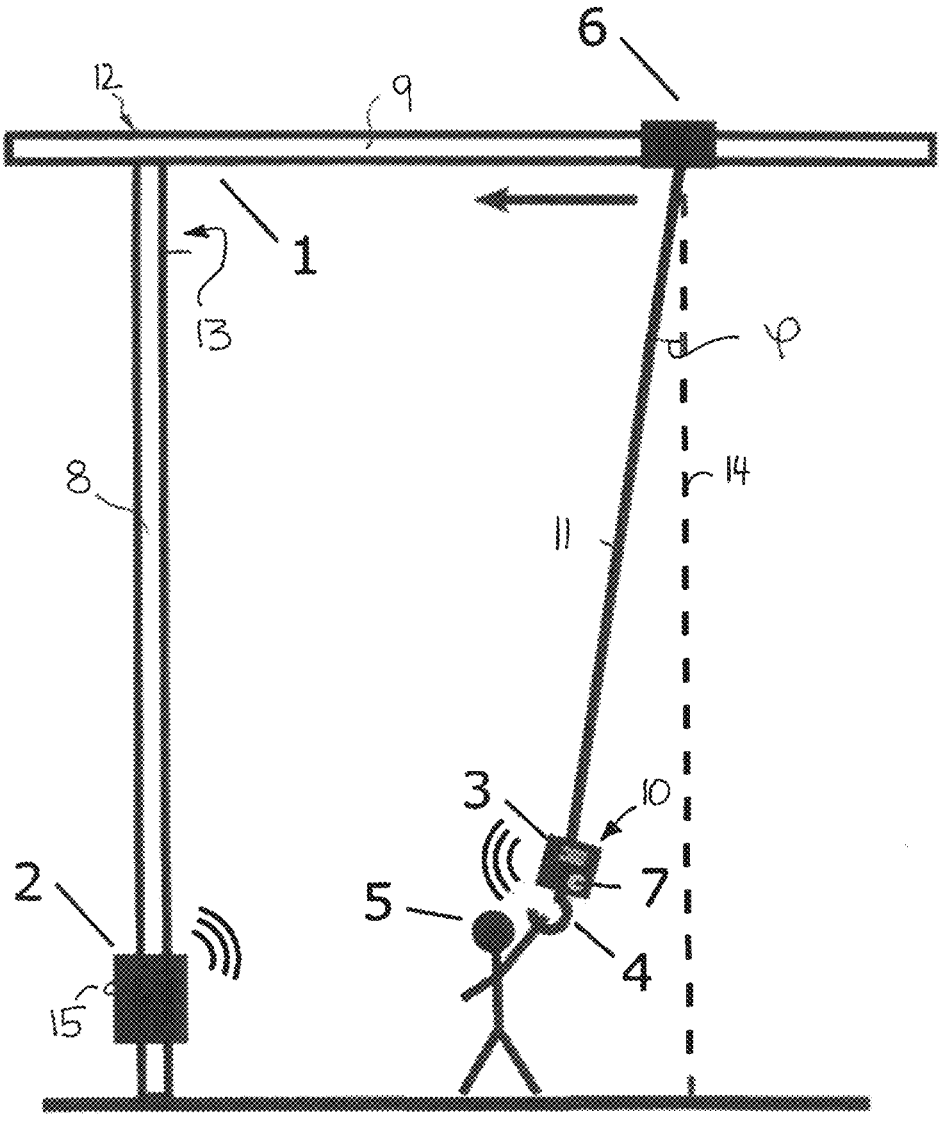
FIG. 1 shows a side view of a construction and/or material handling machine in the form of a tower crane according to an advantageous embodiment of the invention, wherein the functional element in the form of the load hook of the tower crane is provided with an inertial measuring unit and is pulled in a predetermined direction by a machine operator in order to cause the drive devices of the tower crane to move accordingly.

As FIG. 1 shows, the construction and/or material-handling machine 1 can be configured as a crane, for example a tower crane, telescopic boom crane, port crane or offshore crane, wherein the tower crane shown in FIG. 1 comprises a tower 8 which carries a boom 9 which, if necessary, can be rotated together with the tower 8—when configured as a bottom slewer—about an upright axis of rotation by a slewing gear. A trolley 6 can be moved on the boom 9 in the longitudinal direction of the boom 9 by a trolley drive, wherein a functional element 10 comprising a load hook 4 is suspended on the trolley 6 in an oscillating manner. Said load hook 4 is thereby hinged to the trolley 6 by a hoist rope 11 in order to be lifted and lowered. A hoist is provided for this purpose which can retract and lower the hoist rope 11. Said hoist rope 11 can be guided to the load hook 4 in one or more strands and deflected there, in particular around a deflection pulley.

Said drive devices 12 in the form of said slewing gear, trolley drive and hoisting gear can be operated by an electronic controller 2, which may comprise a control computer arranged on the crane itself, which may have, for example, a microprocessor and a program memory. In this regard, said controller 2 can control various actuators, hydraulic circuits, electric motors and other actuators to actuate said drive devices 12. The controller 2 may also include a monitoring device that monitors the load capacity of the tower crane and, if necessary, shuts down the drives when an overload condition is imminent.

In a manner known per se, the controller 2 may have controls in a machine operator's station 13 for inputting control commands, for example in the form of one or more joysticks, one or more touchscreens, one or more rotary slide and/or rocker switches, or other operating keys.

However, said drive devices 12 can also be actuated by directing the load hook 4, as shown in FIG. 1. For this purpose the controller 2 can communicate with a detection device 3 attached to the load hook 4.

Said detection device 3 can be configured, in particular, to detect an oblique pull of the hoist rope 11 and/or deflections of the load hook 4 with respect to a vertical line 14 passing through the suspension point of the load hook 4, that is, through the trolley 6. In particular, a rope pull angle φ against the line of gravity can be detected, cf. FIG. 1.

Said detection device 3 comprises in this case an inertial measurement device IMU or inclinometers attached to the load hook 4, which can transmit its measurement signals preferably wirelessly to a receiver connected to the controller 2, cf. FIG. 1.

Such an inertial measurement unit IMU can in particular have acceleration and rotational rate sensor means for providing acceleration signals and rotational rate signals that indicate, on the one hand, translatory accelerations along different spatial axes and, on the other hand, rotational rates or gyroscopic signals with respect to different spatial axes. Rotational rates, but generally also rotational accelerations, or also both, can here be provided as rotational rates. Alternatively, the use of inclination sensors is also possible.

The inertial measurement unit IMU can advantageously detect accelerations in three spatial axes and rotational rates about at least two spatial axes. The accelerometer means can be configured as working in three axes and the gyroscope sensor means can be configured as working in at least two axes. In the case of inclinometers, at least two spatial axes are advantageously detected.

The inertial measurement unit IMU attached to the load hook 4 can advantageously transmit its acceleration and rotational rate signals and/or signals derived therefrom wirelessly to the controller 2, wherein the transmission can, for example, take place via a WLAN connection.

In this respect, the load hook 4 can tilt in different directions and in different manners with respect to the hoist rope 11 in dependence on the connection. The oblique pull angle φ of the hoist rope 11 is approximately identical to the orientation of the load hook when the rope is tensioned.

In order to be able to detect deflections of the load hook 4 in a vertical plane containing the boom 9—as shown in FIG. 1—and also deflections transverse thereto, the signals supplied by the sensor means of the inertial measurement unit IMU can be filtered or evaluated by orientation filters and/or the determination device 15 of the electronic controller 2 can evaluate said measurement signals of the inertial measurement unit IMU on the basis of a movement model which models the pendulum movements of the load hook 4. Said deflection movements of the load hook 4 in the direction of travel of the trolley 6 and transversely thereto can be considered separately from one another, wherein the deflection components determined by the motion modeling can be added up, if necessary, in order to be able to precisely determine oblique deflections both in the direction of travel of the trolley and transversely thereto with regard to their direction and/or magnitude.

Depending on the direction of the deflection of the load hook 4 determined by the determining device 15, in particular depending on the amount determined by the determining device 15 and the determined direction of the angle φ, the controller 2 actuates one or more of said drive devices 12 to compensate or minimize the deflection φ. In other words, the controller 2 moves the drive devices 12 in dependence on the determined deflection φ in such a way that the trolley 6 follows the said deflection of the load hook 4. This allows the machine operator 5 to direct the crane in a simple, intuitive manner. The controller 2 moves the movable elements of the crane to where the load hook 4 is directed.

In order to also be able to direct lifting and lowering movements on the load hook 4, the inertial measurement unit IMU can be configured to also measure twisting or tilting of the load hook 4 about a horizontal axis, as explained at the beginning. Alternatively or additionally, a rotation of the load hook 4 about an upright axis of rotation can be measured by the inertial measurement unit IMU. These rotating and/or tilting movements or the corresponding sensor signals of the inertial measurement unit IMU can be interpreted by the controller 2 as a control command to lift or lower the load hook 4, i.e. the controller 2 can actuate the lifting mechanism in dependence on such measurement signals in order to lift or lower the load hook.

Alternatively or additionally, however, an input device 7 can also be provided on the load hook 4 for directing lifting and lowering movements, for example in the form of two operating keys, one of which transmits a hoist request when pressed down and the other transmits a lowering request when pressed down, advantageously wirelessly, to the controller 2.

Advantageously, in order to avoid undesired movement of the machine 1 in the event of unintentional deflections of the load hook 4, said input device 7 may also comprise an activation input means to be actuated in order to switch the controller 2 into a deflection control mode in which the controller 2 actuates the drive devices 12 as described in dependence on the measurement signals of the inertial measurement device IMU. If said activation input means is not actuated, said deflection control mode is deactivated, so that deflection of the load hook 4 does not result in crane traversing movements.

Figure 2:
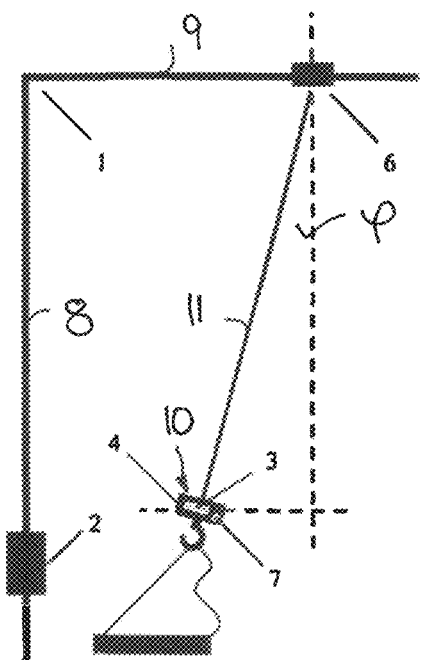
FIG. 2 shows a side view of the tower crane similar to FIG. 1, wherein the load hook of the crane is coupled to a load to be lifted while the hoist rope is subjected to an oblique pull, so that the oblique pull compensation operation mode of the controller first compensates for the oblique pull before the hoisting movement is performed.
Figure 6:
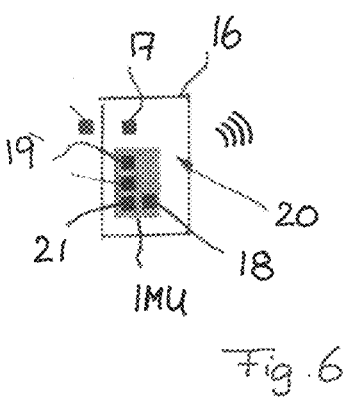
FIG. 6 shows a top view of the control menu that can be displayed on the touch screen of the end device from the previous figures.

As FIG. 2 shows, the controller 2 can also include an oblique pull compensation operation mode that implements lift control commands with a delay, or implements them only when the oblique pull angle φ of the hoist rope 11 approaches zero or is below a threshold value due to automated actuation of the other drives.

If, for example, as shown in FIG. 2, the load hook 4 is hooked onto a load while the hoist rope 11 is being pulled at an angle and a hoisting command is input in the manner described—for example, by tilting the load hook 2 and/or actuating the hoisting operating means—the controller 2 checks, in said oblique pull compensation operation mode, whether the oblique pull angle φ of the hoist rope 11, which was determined with the aid of the signals from the inertial measurement unit IMU, is below said threshold value. If this is not the case, the controller 2 causes the drive devices 12 to be actuated in order to compensate for or reduce the oblique pull, i.e. to reduce the oblique pull angle φ. In the constellation shown in FIG. 2, for example, the trolley 6 can be moved closer to the tower 8. Alternatively or additionally, other drive movements can be initiated, for example, the slewing gear can be actuated to reduce the oblique pull φ.

Only when the oblique pull angle φ is sufficiently small does the controller 2 cause the hoisting device to be actuated in order to lift the load.

As FIGS. 3 and 4 show, a mobile end device 16, for example in the form of a smartphone or a tablet with an inertial measurement unit IMU, can also be used to control the functional element in the form of the load hook 4 by tilting or inclining said mobile end device 16.

In this context, the inclination of the mobile end device 16 can be determined using, for example, the inertial sensor system built into commercially available smartphones. The speed and acceleration of the load 22, which is picked up on the load receiving means 4, can be controlled by the controller 2 via the drive devices 12 already specified in the form of a slewing gear, a trolley drive and a hoist gear in dependence on the deflection of the mobile end device 16 from a state of rest 23.

Said state of rest 23 can advantageously be defined by the machine operator or operator in a terminal application, for example, by pressing or touching or actuating an input means 18, for example, in the form of a button on the end device 16. Said application at the terminal end device 16 may be a software module that is loaded into the end device 16 and can be executed there by its processor. Said input means 18 may be, for example, a soft key on a touchscreen of the end device 16.

When the mobile end device 16 is tilted after actuation of the state of rest input means 18, the inertial measurement unit IMU of the end device 16 provides corresponding acceleration and rotational rate signals, which are processed by a determination device 17, which may be implemented in the end device 16 or may also be provided on the controller 2, to determine the deflection of the mobile end device. The controller 2 then controls said drive devices 12 in dependence on the determined deflection or tilting of the mobile end device 16 in order to move the functional element 10, in particular the load hook 4, in accordance with the tilting of the end device 16.

Advantageously, the mobile end device 16 or also the controller 2 may provide a sensitivity setting for the user. Corresponding sensitivity setting means 19 can advantageously be provided on the mobile end device 16 in order to be able to influence the relationship between the inclination or deflection of the mobile end device 16 and the speed and/or acceleration of the functional element 10, in particular in the form of the load hook 4 and the load 22 hinged thereto.

After a signal is triggered by the user, for example by pressing a button or actuating another input means, the inclination of the end device 16, which is preferably calculated in the application, is transmitted to the control 2 of the machine via a wireless connection, for example in the form of a radio link. Said controller 2 then controls the drives 12 according to the user's specification.

Alternatively or additionally, the load hook 4 with the load 22 attached thereto or, more generally, the functional element 10 can be moved by a corresponding movement of the drive devices 12 during a tilting movement of the mobile end device 16 by a distance defined in advance or adjustable by the user. If the smartphone or mobile terminal 16 is returned to the vicinity of the state of rest 23 and then deflected again, the load hook 4 with the hinged load 22 or the functional element 10 is again moved by the drive devices 12 by a corresponding distance.

The sign of the inclination of the end device thereby determines the direction of movement of the functional element 10 and thus of the drive devices 12.

For example, while an inclination about the Y-axis shown in FIG. 4 can cause a movement in the boom direction, an inclination about the X-axis shown in FIG. 4 can cause a movement perpendicular to the boom. Alternatively or additionally, a rotation around the Z-axis shown in FIG. 4 can be used to raise or lower the crane hook 4 or the functional element 10 by a predefined distance or a distance that can be set by the user, preferably on the end device 16.

Alternatively, however, other assignments of rotations of the end device 16 and movements of the load hook 4 or the functional element 10 can be provided.

Advantageously, the controller 2 comprises a load pendulum damping device to enable the load 22 or the functional element 10 to be moved with as little pendulum as possible, and thus intuitively, in dependence on the tilting or inclining movements of the end device 16.

As FIG. 5 shows, however, the mobile end device 16 can also be used in other ways to move the functional element 10, in particular the load hook 4 of the machine, wherein for this purpose there can be used in particular the localization function of a smartphone or similar mobile end device 16.

In particular, position determining device can determine changes in the position of the mobile end device 16 and transmit them to the controller 2 of the machine so that the controller 2 can actuate said drive devices 12 so that the functional element 10, in particular the load hook 4, tracks the changing position of the mobile end device 16.

Such positioning means may be integrated in the mobile end device 16 and may be based, for example, on satellite navigation and/or mobile radio data and/or said inertial measurement unit IMU.

In this regard, an activation signal may be triggered in an application, which may comprise a software module of the mobile end device 16, for example by actuating an activation input means 21, for example in the form of a button, to activate the position tracking control. Pressing the start button defines the starting point, so to speak, of the movement of the mobile end device 16 to be tracked. The position sensing means 20 provides position data, based on which the application of the terminal end device 16 or even the controller 2 calculates a relative movement of the terminal end device 16 with respect to the starting point. The calculated relative movement or change in position can be used by the controller 2 as a target path 24 to move the functional element 10, in particular the load hook 4 along a corresponding path.

The controller 2 controls the drive devices 12 in such a way that the load hook 4 executes a movement that substantially corresponds to said target path 24 traveled by the mobile end device 16.

For example, in FIG. 5, position a shows the initial situation where the user has actuated the activation input means 21 and from which view the user moves along the dashed target path 24 with the terminal end device 16. At location b, the signal can be transmitted to the controller 2 as a target path for the load hook 4, for example, by actuating an input means on the end device 16, whereupon the controller 2 actuates the drive devices 12 accordingly and the load hook 4 follows the target path.

The end of the movement can be signaled, for example, at position c by a renewed actuation of an input means.

Alternatively or additionally, the start and end of the movement can also be signaled by holding down the input means for a longer period of time.

We claim:

1. A construction and/or material-handling machine comprising a crane, wherein the machine comprises:

a movable functional element suspended in an oscillating manner, wherein the movable functional element comprises a load receiver comprising at least one drive device for moving the functional element, a detection device for detecting manual manipulation movements for moving the functional element, and a controller for actuating the at least one drive device on the basis of the detected manipulation movement, wherein the detection device has a first inertial measuring unit (IMU) attached directly to the functional element and comprises an acceleration and rotational rate sensor for providing acceleration and rotational rate signals, and a determination device for the determination of a measured deflection of the functional element from an acceleration signal and a rotational rate signal of the first IMU, wherein the determination device comprises a first determiner for determination and/or estimation of a tilt of the functional element from the acceleration signal and the rotational rate signal of the first IMU and a second determiner for determination of the deflection of a pendulum suspension of a hoist rope carrying the functional element with respect to the vertical from the determined and/or estimated tilting of the functional element and an inertial acceleration of the pendulum suspension, wherein the first determiner comprises a complementary filter having a high-pass filter configured to filter the rotational rate signal of the first IMU; and a low-pass filter configured to filter the acceleration signal of the first IMU or a signal derived therefrom, wherein the complementary filter is configured to link with one another; an estimate of a tilt of a load receiver that is supported by a rotational rate and that is based on the high-pass filtered rotational rate signal; and an estimate of the tilt of the load receiver that is supported by acceleration and based on the low-pass filtered acceleration signal with one another; and wherein the complementary filter is configured to determine the estimated tilt of the load receiver from linked estimates of the tilt of the load receiver supported by the rotational rate and by the acceleration, and wherein the controller is configured to actuate the at least one drive device so as to compensate for the determined measured deflection of the functional element.

2. The machine of claim 1, wherein a second IMU is attached to a mobile end device and is configured to provide acceleration and rotational rate signals of the mobile end device, and the determination device is configured to determine a deflection of the mobile end device from the acceleration and rotational rate signals of the mobile end device, and wherein the controller is configured to actuate the at least one drive device in dependence on the determined deflection of the mobile end device from a state of rest.

3. The machine of claim 1, wherein the determination device comprises at least one orientation filter for filtering the acceleration signal and rotational rate signal of the first IMU for determination of a direction of deflection of the functional element, and the controller is configured to adjust the at least one drive device in dependence on the determined direction of deflection.

4. The machine of claim 1, wherein the determination device is adapted to determine an amount of deflection of the functional element and/or a mobile end device, wherein the controller is adapted to actuate the at least one drive device faster when the amount of deflection of the functional element and/or the mobile end device is larger and slower when the amount of deflection of the functional element and/or the mobile end device is smaller.

5. The machine of claim 1, wherein the determination device is configured to determine an oblique pull of the functional element suspended in an oscillating manner relative to a vertical line passing through a pendulum suspension point from the acceleration signal and rotational rate signal of the first IMU, and wherein the controller is configured to move the pendulum suspension point in a horizontally aligned plane in dependence on the determined oblique pull by actuating the at least one drive device in such a way that the oblique pull becomes smaller.

6. The machine of claim 5, wherein said detection device comprises an inclination sensor which is configured to directly measure the deflection of the functional element taking into account an installation direction, and wherein the deflection of the functional element comprises the oblique pull.

7. The machine of claim 6, wherein the pendulum suspension point is attached to a trolley which is movable along a boom by a trolley drive, wherein the boom is rotatable about an upright axis of rotation by a slewing gear, wherein the controller is configured to actuate the trolley drive and/or the slewing gear in dependence on an oblique pull angle such that the oblique pull becomes smaller.

8. The machine of claim 2, wherein the mobile end device comprises an input element for presetting and/or resetting a rest position of the mobile end device, and wherein the determination device is configured to determine the deflection of the mobile end device from the acceleration and rotational rate signals of the mobile end device after the state of rest has been preset and/or reset.

9. The machine of claim 2, wherein the mobile end device and/or the controller comprise a setting element for adjusting a sensitivity of the control of the at least one drive device in dependence on the deflection of the mobile end device in such a way that a speed and/or acceleration of the at least one drive device to be controlled for a certain deflection of the mobile end device is variably adjustable.

10. The machine of claim 1, wherein the controller is configured to convert a deflection of a mobile end device and/or of the functional element in an interval-like manner into a predetermined, limited movement distance and to provide a further movement distance for the at least one drive device only after a reduction of the deflection and a renewed deflection of a mobile end device and/or of the functional element.

11. The machine of claim 10, wherein the controller and/or a mobile end device comprise a setting element for adjusting the limited movement distance of the drive device predetermined per deflection.

12. The machine of claim 1, wherein the determination device is adapted to determine rotational and/or tilting movements of the functional element about an upright axis of rotation from the acceleration signal and rotational rate signal of the first IMU, and wherein the controller is configured to actuate a lifting mechanism for lifting and lowering the functional element in dependence on the determined rotary movement of the functional element about the horizontal axis.

13. The machine of claim 12, wherein the controller is adapted to convert a certain rotational movement of the functional element and/or a mobile end device about the upright axis into lowering or lifting the functional element one or more times by a predetermined amount.

14. The machine of claim 1, wherein the functional element comprises an input device for inputting a hoist control signal and a lowering control signal.

15. The machine of claim 1, wherein the functional element comprises an activation input element for activating and deactivating a deflection control mode of the controller, and wherein the controller controls the at least one drive device in dependence on the deflection of the functional element determined from the acceleration signal and the rotational rate signal of the first IMU, wherein the activation input element is configured such that the deflection control mode of the controller is activated only when the activation input element is actuated.

16. The machine of claim 1, wherein the detection device comprises an inclination sensor and a communicator for wireless communication with the controller.

17. The machine of claim 1, wherein the functional element comprises an energy accumulator for supplying energy to the detection device, wherein the energy accumulator comprises a rechargeable battery, and wherein the first inertial measuring unit is connected to the energy accumulator.

18. The machine of claim 1, wherein the functional element comprises a generator for generating electrical energy from movements occurring at the functional element and/or forces acting thereon for supplying energy to the detection device.

19. The machine of claim 18, wherein the generator is drivable by a deflection pulley by which the functional element is pendulously suspended via the hoist rope.

20. The machine of claim 1, wherein the rotational rate-based estimation of the tilt of the load receiver comprises an integration of the high-pass filtered rotational rate signal and/or the acceleration based estimation of the tilt of the load receiver is based on a quotient of a measured horizontal acceleration and a measured vertical acceleration.

21. The machine of claim 1, wherein the complementary filter and/or an observer device comprises an extended and/or unscented Kalman filter.

22. The machine of claim 1, wherein the detection device comprises a position determiner for determining a change of position of a mobile end device, and wherein the controller is adapted to actuate the at least one drive device such that the functional element tracks the changing position of the mobile end device.

23. The machine of claim 22, wherein the mobile end device comprises an activation input element for activating and deactivating a tracking control mode of the controller, and wherein the controller is configured to actuate the at least one drive device depending on the changing position of the mobile end device, wherein the activation input element is configured so that the tracking control mode of operation of the controller is activated only when the activation input element is actuated.

24. The machine of claim 23, wherein the position determiner comprises a satellite navigation module and/or is adapted to determine the changing position of the mobile end device from mobile radio data and/or from acceleration and rotational rate signals of a second IMU.

25. A method for controlling a construction and/or material-handling machine, wherein the machine comprises a movable, functional element suspended in an oscillating manner, comprising:

moving the functional element by at least one drive device;

actuating the at least one drive device by a controller of the machine in dependence on manual manipulation movements for moving the functional element which are detected by a detection device;

transmitting acceleration and rotational rate signals to the functional element from a first inertial measurement unit (IMU) mounted to the functional element and having acceleration and rotational rate sensors which indicate translatory accelerations and rotational rates at the functional element;

transmitting wirelessly to the controller the translatory accelerations and rotational rates at the functional element;

determining a deflection of the functional element relative to a vertical line passing through a pendulum suspension point of the functional element by a determination device from acceleration and rotational rate signals, wherein the determination device comprises a first determiner for determination and/or estimation of a tilt of the functional element from the acceleration and rotational rate signals of the first IMU and a second determiner for determination of the deflection of a pendulum suspension of a hoist rope carrying the functional element with respect to the vertical from the determined and/or estimated tilting of the functional element and an inertial acceleration of the pendulum suspension, wherein the first determiner comprises a complementary filter having a high-pass filter configured to filter a rotational rate signal of the first IMU; and a low-pass filter configured to filter an acceleration signal of the first IMU or a signal derived therefrom, wherein the complementary filter is configured to link with one another; an estimate of a tilt of a load receiver that is supported by a rotational rate and that is based on the high-pass filtered rotational rate signal; and an estimate of the tilt of the load receiver that is supported by acceleration and based on the low-pass filtered acceleration signal with one another; and wherein the complementary filter is configured to determine the estimated tilt of the load receiver from linked estimates of the tilt of the load receiver supported by the rotational rate and by the acceleration; and actuating the at least one drive device by the controller to compensate for the determined deflection of the functional element.

26. The method of claim 25, wherein the acceleration and rotational rate signals indicate the translatory accelerations and the rotational rates of the functional element, and wherein second acceleration and rotational rate signals are provided at a mobile end device of a machine operator or machine attendants by a second IMU mounted on the mobile end device with acceleration and rotational rate sensors and are provided and transmitted wirelessly to the controller;

determining a deflection of the mobile end device relative to a state of rest of the mobile end device being determined by the determination device from the acceleration and rotational rate signals; and actuating the at least one drive device by the controller in dependence on the deflection of the mobile end device.

27. The method of claim 25, further comprising:

detecting a changing position of a mobile end device of a machine operator and/or machine attendant by a position determiner;

transmitting position signals representing the changing position to the controller; and actuating the at least one drive device by the controller in dependence on the transmitted position data so that the functional element tracks the changing position of the mobile end device.

* * * * *